3,692,632
PROCESS FOR PRODUCING LIPASE
Osamu Terada, Tokyo, Japan, assignor to Kyowa Hakko
   Kogyo Co., Ltd., Tokyo, Japan
No Drawing. Continuation of application Ser. No.
   572,688, Aug. 16, 1966. This application July 11,
   1968, Ser. No. 743,939
Claims priority, application Japan, Aug. 17, 1965,
   40/49,715
Int. Cl. C12d 13/10
U.S. Cl. 195—66 R          4 Claims

ABSTRACT OF THE DISCLOSURE

A process for producing lipase by fermentation. A microorganism of Trichosporon is cultured in a nutrient medium under aerobic conditions at 25°–35° C.

CROSS REFERENCE TO RELATED APPLICATION

This application is a continuation of copending application Ser. No. 572,688, filed on Aug. 16, 1966, which application is now abandoned.

This invention relates to a process for producing lipase. More particularly, it relates to a process for the production of lipase by fermentation. Even more particularly, the invention relates to a process for the production of lipase or lipase-containing substances by fermentation with microorganisms belonging to the genus Tichosporon.

The true lipases are hydrolytic enzymes which hydrolyze fats into fatty acids and glycerol. Pancreatic lipase, which has heretofore been extracted and produced from the pancreas of animals, catalyzes the hydrolysis of a wide variety of fats and oils. The rate of this hydrolysis is greatest when the substrates contain fatty acids of intermediate chain length, for example, lauric and myristic acids. Thus, alhough lipase is a valuable and useful substance, the extraction method for the production thereof is undesirable and expensive since the raw materials are limited in quantity and the processes of extraction and purification are complicated. This has been a real obstacle in developing an industrial scale process for the production of lipase.

One of the objects of the present invention is to provide an improved process for the preparation of lipase which overcomes the disadvantages and deficiencies of the prior art methods.

Another object of the present invention is to provide a process for producing lipase by fermentation which may be carried out in an efficacious and simple manner.

A further object of the invention is to provide a process for producing lipase by fermentation which gives the product in high purity and good yield.

A still further object of the invention is to provide a process for producing lipase by fermentation which may be carried out advantageously and economically on an industrial scale to give a high yield of product.

These and other objects and advantages of the present invention will become apparent to those skilled in the art from a consideration of the following specification and claims.

In accordance with the present invention, the present inventor has found that a new strain species of yeast belonging tot he genus Trichosporon possesses the capability of producing lipase in large amounts. In particular, the strain Trichosporon heteromorphum is employed in accordance with the persent invention. Culturing of this strain under aerobic conditions results in an expensive and advantageous process for the production of lipase.

Trichosporon heteromorphum, the lipase-producing microorganism of the present invention, was isolated from the excrements of animals. The fungological features thereof are as follows:

(1) Shape: This is extremely variable. The shape of this microorganism is observed as being circular, oval, elliptical, and cylindrical in a size ranging from $4-6\mu$ x $5-12\mu$. Frequently, mycelium consisting of longer cellular chains having a size of $4-6\mu$ x $15-35\mu$ can be observed.

(2) Slant culture and giant colony: The central part thereof is slightly protruded, showing a powdery nature. The peripheral part is semi-transparent, consisting of radial mycelia.

(3) Slide culture: Genuine mycelia, pseudomycelia and arthrospore are germinated. The arthrospore shows a long chain form in air.

(4) Static culture: A thick, brittle mycelium membrane is formed in malt juice, and the surface thereof becomes creasy and powdery. The precipitated cells are circular or elliptical and are increased by sporulation.

(5) Endospore: Endospores are not formed.

(6) Ethanol: Ethanol is utilized.

(7) Fermentation of sugar: This fermentation does not occur.

(8) Utilization of sugar: Glucose, galactose and sucrose are utilized, but maltose and lactose are not utilized.

(9) Albumin: Albumin is not decomposed.

(10) Nitrates: Nitrates are not utilized.

When the above properties are compared with those set forth in J. Lodder and N. J. W. Kreger-Van Rij: The Yeast, a Taxonomic Study, North Holland Publishing Co., Amsterdam, and Interscience Publishers, Inc., New York (1952) and other works, they are seen to be those associated with the genus Trichosporon. Yet, these properties are not identical with the descriptions given for known species. Examples of such are illustrated in Table 1. It will be noted that the name Trichosporon heteromorphum nov. sp. has been given to the microorganism of the present invention.

TABLE 1

[Physiological properties of yeasts of the genus Trichosporon]

| | Utilization of sugar | | | Utilization of nitrates | Utilization of ethanol | Utilization of albumin |
|---|---|---|---|---|---|---|
| | Sucrose | Maltose | Lactose | | | |
| Trichosporon pullulans | + | + | ± | + | + | + |
| Trichosporon cutaneum | + | + | + | − | ∓ | ∓ |
| Trichosporon infestans | − | + | + | − | ± | + |
| Trichosporon margaritiferum | + | + | − | + | − | − |
| Trichosporon sericeum | − | − | − | − | + | − |
| Trichosporon capitatum | − | − | − | − | ∓ | − |
| Trichosporon fermentans | − | + | − | − | + | − |
| Trichosporon behrendit | + | + | − | − | + | + |
| Trichosporon heteromorphum | + | − | − | − | + | − |

The following examples are given merely as illustrative of the present invention and are not to be considered as limiting. Unless otherwise noted, the percentages therein are by weight per liter of water.

EXAMPLE 1

*Trichosporon heteromorphum* No. 33–1 ATCC 20001 is inoculated into a culture medium containing 1% of soybean oil, 2% of soybean residue and 1% of cornsteep liquor. Culturing is then carried out aerobically with ventilation and agitation at 30° C.

After 48 hours of culturing, the mycelium and solid substances are removed by centrifugation. The activity value of the lipase accumulated in the culture liquor is measured by the quantitative analysis method described by Fiore and Nord, Archives of Biochemistry, Volume 23, 473 (1949), and is found to be 13.0u./ml.

EXAMPLE 2

Culturing is carried out with the same strain and under the same conditions as described in Example 1. The supernatant liquid obtained by centrifugation of the resultant culture liquor is concentrated under a reduced pressure and at 30° C. to one tenth of its original volume. Two times the resultant volume of cooled acetone is added to the solution, while it is cooled with ice and agitated. The white thread-like precipitate is collected and is washed with a small amount of acetone which has been cooled with ice. Then, the precipitate is dried in a desiccator under a reduced pressure. A crude sample of lipase having a yellow-grayish color is obtained thereby. The activity value thereof, measured as described in Example 1, is 45 u./mg.

The fermentation employed in the present invention with the strain *Trichosporon heteromorphum* to obtain lipase is conducted under aerobic conditions, such as aerobic shaking of the culture, at a temperature of about 25 to 35° C. and at a pH of about 6.0 to 7.5. One to five days of culturing under these conditions yields large quantities of the desired lipase.

Either a synthetic culture medium or a natural nutrient medium is suitable in the present invention as long as it contains the essential nutrients for the growth of the Trichosporon strain employed. Such nutrients include substances such as a carbon source, a nitrogen source, inorganic compounds and the like which are utilized by the strain employed in appropriate amounts. Thus, as a carbon source, there may be mentioned by way of example, carbohydrates such as glucose, gelactose and sucrose as well as soybean oil or soybean residue or any other suitable carbon source. Either one carbon source or a mixture of two or more may be employed. As a nitrogen source, various kinds of inorganic or organic salts or compounds, such as urea or ammonium salts such as ammonium chloride, ammonium sulfate, ammonium nitrate, ammonium phosphate, etc., or natural substances containing nitrogen such as cornsteep liquor, yeast extract, meat extract, peptone, fish meal, casein hydrolysates, rice bran extract and the like may be employed. The nitrogen source may also be a single substance or a mixture of two or more suitable substances. Inorganic compounds which may be added to the culture medium include magnesium sulfate, sodium phosphate, potassium dihydrogen phosphate, potassium monohydrogen phosphate, iron sulfate or other iron salts, manganese chloride, calcium chloride, etc. Suitable growth-promoting agents may also be added to the medium, if desired.

After the completion of fermentation, the lipase may be separated from the fermentation filtrate by suitable and appropriate means such as precipitation.

The invention being thus described, it will be obvious that the same may be varied in many ways. Such variations are not to be regarded as a departure from the spirit and scope of the invention, and all such modifications as would be obvious to one skilled in the art are intended to be included herein.

What is claimed is:

1. A process for producing lipase which comprises culturing the microorganism *Trichosporon heteromorphum*, ATCC 20001, in an aqueous nutrient medium under aerobic conditions and recovering the lipase accumulated in the resultant fermentation liquor.

2. A process for producing lipase which comprises culturing the microorganism *Trichosporon heteromorphum* ATCC 20001 in an aqueous nutrient medium containing a source of carbon and nitrogen under aerobic conditions at a temperature of about 25 to 35° C. and at a pH of from about 6.0 to 7.5 and recovering the lipase accumulated in the resultant fermentation liquor.

3. The process of claim 2, wherein the recovery of the lipase is effected by means of precipitation thereof.

4. The process of claim 2, wherein the temperature is maintained at about 30° C.

References Cited

UNITED STATES PATENTS 3,189,529   6/1965   Yamada et al. _____ 195—62

LIONEL M. SHAPIRO, Primary Examiner